May 12, 1970     G. BIXBY, JR.     3,511,166
COFFEE BREWING APPARATUS
Filed Oct. 28, 1968     3 Sheets-Sheet 1
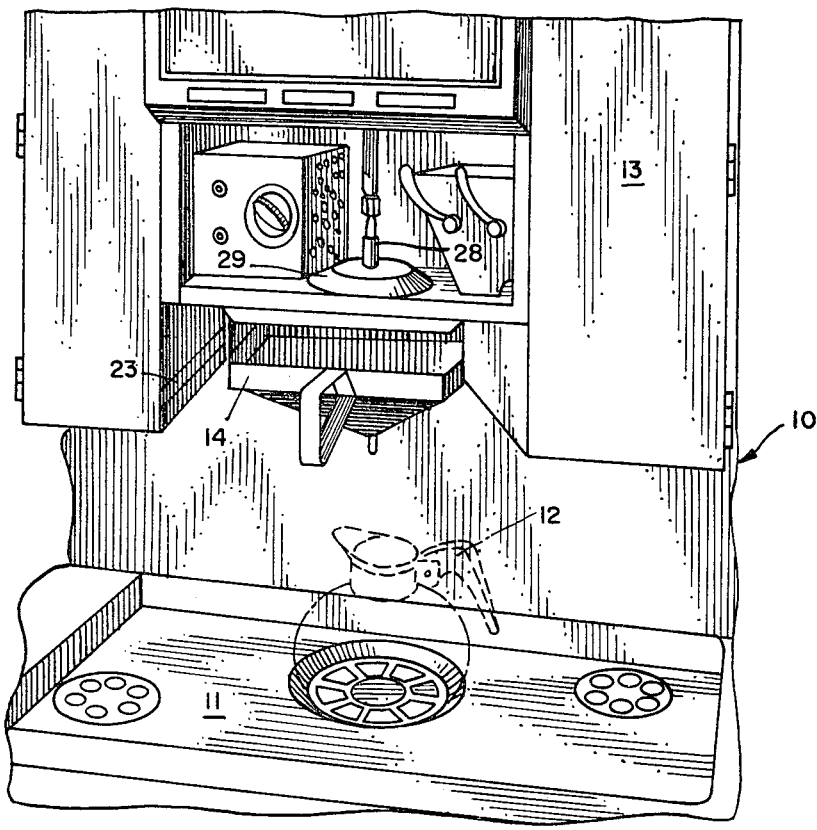
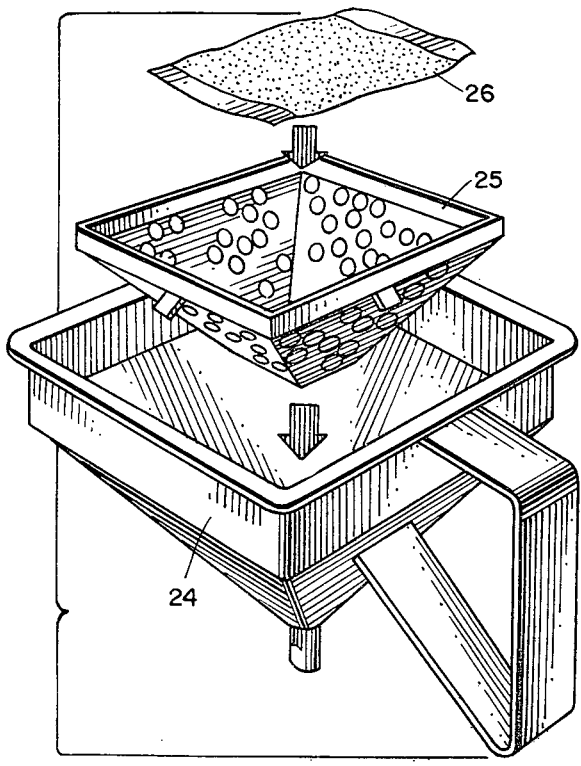
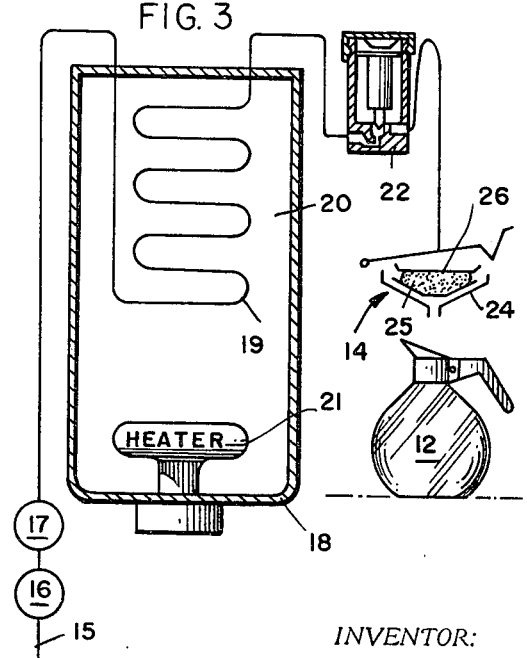
INVENTOR:
GEORGE BIXBY, JR.
BY
Dawson, Tilton, Fallon & Lungmus
ATT'YS May 12, 1970     G. BIXBY, JR     3,511,166
COFFEE BREWING APPARATUS
Filed Oct. 28, 1968     3 Sheets-Sheet 2

INVENTOR:
GEORGE BIXBY, JR.
BY
Dawson, Tilton, Fallon & Lungmus
ATT'YS

INVENTOR.
GEORGE BIXBY, JR.
BY
Dawson, Tilton, Fallon & Lungmus
ATT'YS

United States Patent Office 3,511,166
Patented May 12, 1970

3,511,166
COFFEE BREWING APPARATUS
George Bixby, Jr., Scottsdale, Ariz., assignor to Automatic Marketing Industries, Inc., Phoenix, Ariz., a corporation of Arizona
Filed Oct. 28, 1968, Ser. No. 771,136
Int. Cl. A23f 1/08
U.S. Cl. 99—295
5 Claims

ABSTRACT OF THE DISCLOSURE

Coffee brewing apparatus using a filter bag wherein a movable presser plate confines the bag within an open-topped tray to insure thorough distribution of hot water through the grounds in the filter bag.

BACKGROUND AND SUMMARY OF INVENTION

This invention is an improvement on co-owned Pat. 3,320,073. In that patent, heated water was caused to flow by gravity through coffee in a pre-packaged wet strength paper-like bag. In certain instances it has been found more desirable to use a smaller bag with the water flowing there through by pressure. Such pressure systems have long been known for air lines usage but require brewers that are too complicated for restaurant and office use.

In contrast to this, I employ a pressure system utilizing merely the pressure from the metropolitan mains so that no complicated pressure tanks, etc. are needed. Further, I make use of the heretofore waster gas that is expelled during brewing. In previous systems, trapped air and released gas inflated the coffee bags which resulted in short circuiting of the brewing water. This previously-endured drawback is employed in the invention to create a fluid seal with a movable presser plate mounted above the bag, the bag itself being confined in a flat bottomed, foraminous tray. I also provide unique bag expansion freedom means through the movement of the presser plate during the brewer cycle.

The invention here is particularly suited for restaurant usage and for that purpose two different types of water sources are provided. It will be appreciated that in some instances space considerations dictate a rather short tank and one embodiment of the invention is responsive to this need. In either event, however, the apparatus providing the source of brewing water is effective in conjunction with the brewer itself in substantially minimizing "drip-out." By drip-out, I refer to liquid draining from the brewer after the main body of liquid has passed through the brewer. It will be quickly appreciated that this is objectionable for a number of reasons—messiness, wastefulnes, etc.

The invention is described in conjunction with the accompanying drawing, in which:

FIG. 1 is a fragmentary perspective view of apparatus embodying teachings of the invention;

FIG. 2 is an exploded perspective view of the brewer portion of the apparatus of FIG. 1;

FIG. 3 is a schematic view of the apparatus seen in FIG. 1 and is of the type useful for direct connection to a metropolitan water main;

Figure 7:
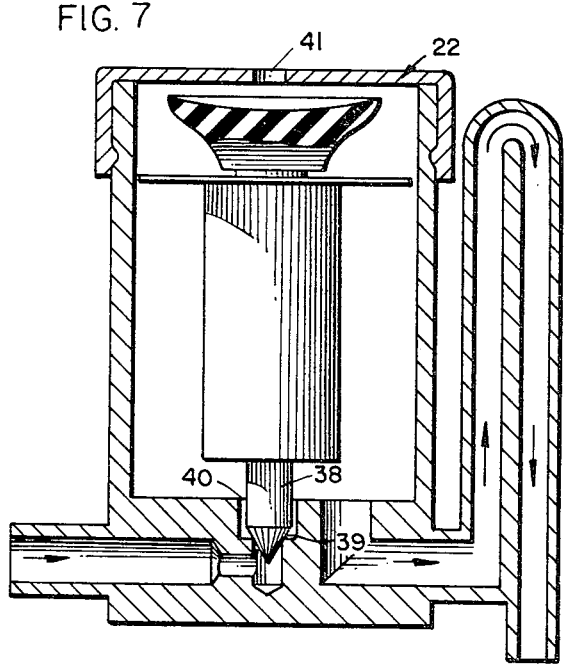
Figure 8:
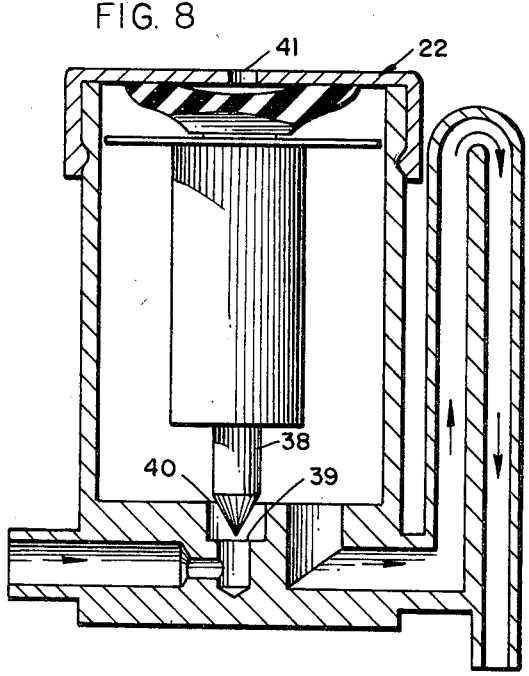
Figure 9:
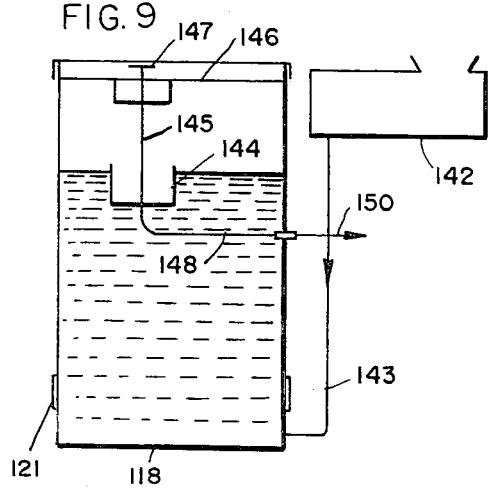
Figure 10:
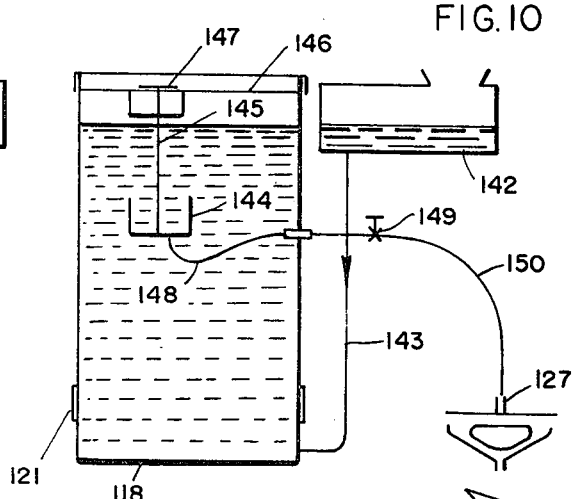

FIGS. 7 and 8 are enlarged elevational views, partially in section, of a check expansion chamber seen in reduced scale in FIG. 3, the showings in FIGS. 7 and 8 being in different stages of operation; and FIGS. 9 and 10 are schematic representations of a modified form of water source, again the two views showing different conditions of the operation of the device.

In the illustration given and with reference to FIG. 1, the numeral 10 designates generally a chassis having a platform 11 for supporting a carafe 12. The chassis 10 provides a housing 13 above the carafe 12 which contains the various elements which cooperate to provide brewed, liquid coffee. An important combination of these elements is seen in the central portion and constitutes the brewer generally designated 14 and which is also seen in exploded form in FIG. 2. The brewer 14 is also seen in FIG. 2.

Turning now to FIG. 3, water for the brewing enters at the extreme left via a conduit or metropolitan main designated 15, passing through a solenoid valve 16 and a flow control valve 17. The water enters a water tank 18 passing through a serpentine heat exchanger coil 19. The water in passing through the coil 19 picks up heat from the water 20 in the tank 18, the water 20 having been heated by virtue of a heater 21 provided in tank 18. From there the water passes through a check expansion chamber 22 and then to the brewer 14.

The brewer unit 14 is removably supported on the side rails 23 (FIGS. 1 and 4) which are provided as part of the housing 13. The brewer consists of a pan 24 having internal dimensions of about 5⅛" x 5¾" and sloping bottom walls providing a bottom outlet while the depth of the bottom walls increases from ½" at the sides to 1⅞" at the central bottom. This pan supports the foraminous tray 25 which is sized to fit within the pan but spaced thereabove about ½", the tray 25 having interior dimensions of 4½" x 5¼" with a set of sloping bottom walls having a maximum depth of 1¼". It is the tray 25 which supports the filter bag 26 filled with ground coffee.

Figure 4:
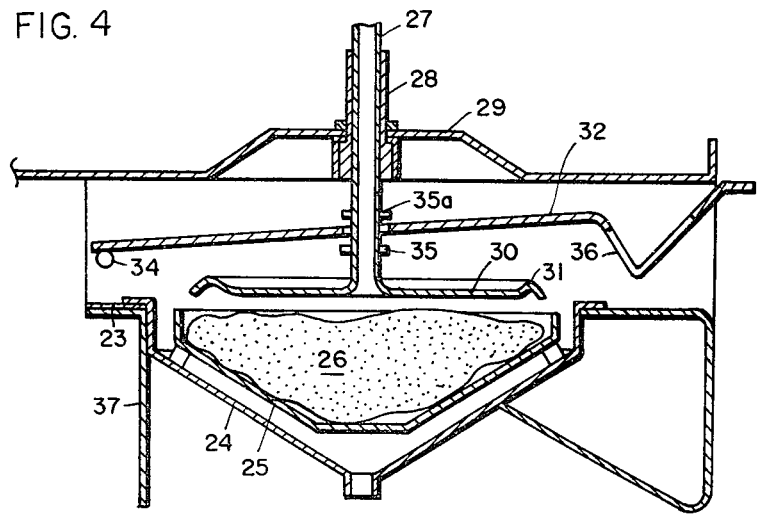
FIGS. 4–6 are fragmentary sectional views of the bag holding portion or brewer part of the apparatus of FIG. 1, but in different stages of operation.

Hot water for the brewing is supplied to the central top of the bag 26 by means of a conduit 27 (see particularly FIG. 4). The conduit is slidably supported within a vertically extending journal 28 provided as part of the housing 13, more particularly, the upwardly dished plate 29 which is connected to the side rails 23.

Figure 5:
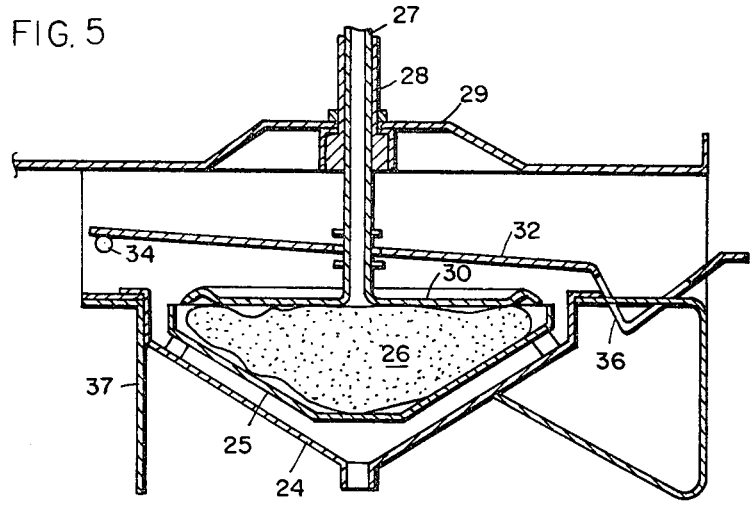

At its lower end, the pipe or conduit 27 carries a disc-like presser plate 30 which, as can be seen in FIG. 5, rests on the bag 26 at the start of a brew cycle. As the brewing continues, the bag 26 expands to the condition designated 26' in FIG. 6, thereby elevating the presser plate 30. Thus, at all times during the brewing cycle, short circuiting of the water around the coffee grounds is prevented, a seal being effected annularly at the position generally designated 30' with the coffee grounds assuming the concave configuration illustrated in FIG. 6. Excellent results are obtained with a presser plate having a raised annular rib as at 31—see particularly FIG. 6.

The means for moving the presser plate 30 includes a first lever 32 which is pivotally supported as at 33 on the side frames 23. As can be appreciated best from FIG. 4, the lever 32 pivots in the openings 33 (in a clockwise motion) until the plate 30 engages the bag 26.

The conduit 27 is equipped with spaced washers 35 and 35a (see FIG. 4) which loosely confine the lever 32 and insure that the plate 30 moves with the lever 32 (compare FIGS. 4 and 5). The lever 32 is shaped to include a cam-like surface 36 which is adapted to drive the brew tray 24 rearward to a stop 37 in the event the tray 24 has not been inserted sufficiently. The appearance or association of lever 32 relative to the brew tray 24 is reassuring to the operator that the brew elements are arranged in proper position.

OPERATION

In FIG. 4, the apparatus is pictured as it would be organized when the tray 24 (with new bag 26) has just been inserted along the rails 23 provided as part of the chassis 13. The lever 32 is still in elevated position. Thereafter, the lever 32 is pivoted clockwise to the configuration seen in FIG. 5 wherein the plate 30 is caused to press down on the bag 26 and the camming surface 36 insures that the pan 24 is properly mounted in its rearmost position within the chassis 13.

Figure 6:
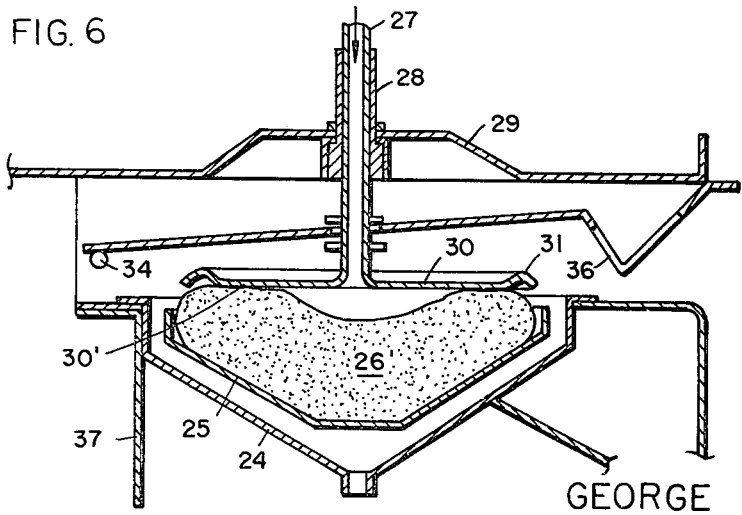

As water flows from the pipe 27, the coffee bag 26 is soon fully wetted, trapping some air. In addition, hot water on the grounds releases carbon dioxide. The result is an expanded bag that presses upward on the presser plate 30. This expansion is limited to the position shown in FIG. 6. The bag expanding against the plate 30 provides adequate sealing to force a substantial portion of the water into the bag 26 and through the coffee grounds. FIG. 6 illustrates a typical distribution of the grounds in the bag. This approximates the ideal uniform bed depth of grounds for uniform extraction.

When the water flow stops, the freely moving presser plate 30 moves downwardly as the bag deflates. The weight of the presser plate 30 and the lever on the bag 26 aid the deflation, hence shortening the drip-out time, particularly as compared to a gravity system. After drip-out or when another brew is required, the lever 32 is raised and the pan 24 removed easily. Thus, there is no danger of ripping the bag of spent grounds with attendant messiness.

The expansion freedom that the bag experiences through the use of the presser plate 30 provides benefits which are not readily apparent. This arrangement is desirable when recognizing that the quality of bag construction and sealing is variable. Confining the bag too much, even though it assures a quick seal, leads to channeling, hence, weak, over-extracted coffee. Too little confinement leads to the possibility of a very late seal and a weak brew or the possibility of the bag rupturing. The inventive arrangement provides a quick seal, sufficient expansion for excellent water distribution through the coffee grounds, yet reasonable confinement to prevent rupture. Should a coffee blend yield slight or a very great amount of gas, the force exerted on the bag can easily be altered to allow the desired extraction response by applying a weight to the lever 32.

The uninterrupted drip-out is additionally insured by the check expansion chamber 22 which is used on the discharge side of the water heat exchanger coil and upstream from the brew pan on the coffee brewer. When the brew cycle ends, the solenoid valve 16 in the inlet line 15 to the heat exchanger closes. The cooler water in the heat exchanger expands as it is heated—by virtue of included gases. As seen in FIG. 8, the expanded water exerts pressure on the plunger 38 and slightly lifts this plunger from its seat 39. This does not fully lift the plunger for this flow is able to pass through the small clearance of the body counterbore and the plunger stem as at 40. The amount of expanded water and its flow rate is very small and the water is easily accommodated by the chamber 22. This will occur only after the pressure of expansion has exceeded the check pressure established by the plunger weight on the orifice area. The approximate check pressure is 10 p.s.i. Should a chamber not be used, the quantity of water forced from the exchanger is much greater because entrained air and/or gases in the water expand considerably. The check feature prevents this excess expansion. Tests without the chamber prove that the next brew can be somewhat short by the expanded quantity lost by dripping.

When the brew is initiated, the water flow rate is great enough to lift the plunger sufficiently for it to seal the top port 41 (see FIG. 8)—thereby preventing further outflow of air and water. The pressure in the heat exchanger is always greater than the pressure in the chamber, hence, entrained gases expand as water enters the chamber and thus limits the water content of the chamber throughout the brew cycle. When the brew cycle ends, the plunger 38 drops onto its seat 39 and opens the port 41 (as in FIG. 7) permitting water in the line from the chamber to the grounds to drain completely by siphon action onto the grounds and thus, eliminating any after-dripping when the brew pan is removed from the machine.

A coffee brewer especially suitable for office use, includes a through type as seen in FIGS. 9 and 10. There I provide a tank 118 having a positive flow cut-off feature for ending the brew. This is desirable to assure a definite brew period. In FIGS. 9 and 10, a float device is illustrated that performs this purpose. Referring now to FIG. 10, the operation of the apparatus seen therein starts with a premeasured amount of water being discharged into the bottom of the tank 118. This comes from a pour-in container 142 and by inter-connecting piping 143. The introduction of the water into the bottom of the tank 118 is at a much greater rate than its discharge rate (brew rate) until the level in the tank equals that in the pour-in container. The level of water in the tank rises until the water level rises over the top of the cup 144. The cup 144 completely floods and sinks to its lower position (see FIG. 9) wherein the stop 147 on stem 145 engages the upper portion of stop 146. Thereupon the brewing starts as water flows through the cup and through the flexible tube 148 connecting the cup to the tank outlet and ultimately to the pipe 127.

As brewing proceeds, the water level sinks to the top rim of the cup 144. At this level the water flow from the cup exceeds the water dribble into the cup and it quickly approaches a buoyant state. As the cup 144 empties, ending the brew, the cup floats upward to its upper stop. The top rim of the cup is well above the water level assuring the flow cutoff feature. The rim-to-water level differential obtained by this arrangement accommodates any water expansion that may occur resulting from heating the cooler water in the bottom of the tank as by heater 121. This arrangement provides the additional feature that it will not air lock or partially air choke as compared to a simple siphon.

When desired, brew time control is achieved by a manual valve 149 in the flexible tubing 150 interconnecting the cup 144 with the pipe 127. This control is advantageous when bags of different weight or grind of coffee are used.

An important feature of this type of pressure system concerns the percent change of pressure head—that this be held as small as practical for a given cabinet height—that the average pressure head be approximately 12" for accepted brew time standards.

While in the foregoing specification a detailed description of the invention has been set down for the purpose of illustration, many variations of the details herein given may be made by those skilled in the art without departing from the spirit and scope of the invention.

I claim:

1. In coffee brewing apparatus wherein heated water is passed through ground coffee confined in the filtering bag supported on an open-topped, flat-bottomed, foraminous tray, the improvement consisting of the fact that said apparatus is equipped with rail means for removably supporting said tray, and a plate mounted on said rail means for movement toward and away from said tray whereby said plate is adapted to be moved into engagement with the top of said bag, said plate having a central discharge outlet for said heated water whereby when said heated water is discharged out of said bag, the swelling of said bag effects a seal with said plate generally annularly relative to said outlet to direct further water into said bag.

2. The apparatus of claim 1 in which said tray is operably associated with a downwardly convergent pan having a bottom discharge outlet, said pan having an installed position on said rail means, said apparatus including lever means adapted to simultaneously bear against said bag and to urge said pan into said position.

3. The apparatus of claim 2 in which said lever means includes an elongated member pivotally mounted on said rail means, said lever member being contoured to provide a cam surface for engaging a portion of said pan to urge the same into position.

4. The apparatus of claim 1 in which water source means, said water source means including a check expansion chamber equipped with a liftable plunger arranged for co-action with a water flow orifice, said plunger, in its elevated position, being arranged and sized to close a gas egress port in said chamber.

5. The apparatus of claim 1 in which water source means are operable associated with said apparatus, said water source means including a tank slidably supporting a floating cup, said cup being equipped with a generally vertically disposed stem having limited vertical movement, conduit means coupling said cup to said plate whereby downward movement of said cup achieves substantially drip-free cutoff of water flow.

References Cited

UNITED STATES PATENTS

| | | | |
|---|---|---|---|
| 3,030,874 | 4/1962 | Fiori | 99—295 |
| 3,086,447 | 4/1963 | Arnett | 99—295 |
| 3,384,004 | 5/1968 | Perlman | 99—295 X |
| 3,450,024 | 6/1969 | Martin | 99—295 |

R. W. JENKINS, Primary Examiner

U.S. Cl. X.R.

99—302

PO-1050
(5/69)

UNITED STATES PATENT OFFICE
CERTIFICATE OF CORRECTION

Patent No. 3,511,166     Dated May 12, 1970

Inventor(s) George Bixby, Jr.

It is certified that error appears in the above-identified patent and that said Letters Patent are hereby corrected as shown below:

In claim 4, line 6, "egrees" should be --egress--.

In claim 5, line 8, "operable" should be --operably--.

SIGNED AND
SEALED

SEP 29 1970

(SEAL)
Attest:

Edward M. Fletcher, Jr.
Attesting Officer

WILLIAM E. SCHUYLER, JR.
Commissioner of Patents